(12) United States Patent
Potter

(10) Patent No.: US 9,548,862 B1
(45) Date of Patent: Jan. 17, 2017

(54) MANAGING ENTROPY IN COMPUTING DEVICES FOR CRYPTOGRAPHIC KEY GENERATION

(71) Applicant: SafeLogic Inc., Palo Alto, CA (US)

(72) Inventor: Ray Potter, Palo Alto, CA (US)

(73) Assignee: Safelogic, Inc., Palo Alto, CA (US)

( * ) Notice: Subject to any disclaimer, the term of this patent is extended or adjusted under 35 U.S.C. 154(b) by 101 days.

(21) Appl. No.: 14/543,678

(22) Filed: Nov. 17, 2014

(51) Int. Cl.
*H04L 9/00* (2006.01)
*H04L 9/08* (2006.01)

(52) U.S. Cl.
CPC ......... *H04L 9/0869* (2013.01); *H04L 2209/24* (2013.01)

(58) Field of Classification Search
USPC ..................... 380/28, 46, 268, 270
See application file for complete search history.

(56) References Cited

U.S. PATENT DOCUMENTS

| | | | | |
|---|---|---|---|---|
| 2005/0084110 A1* | 4/2005 | Palmer | ................. | H04L 9/0662 380/268 |
| 2007/0230694 A1* | 10/2007 | Rose | ........................ | G06F 7/58 380/46 |
| 2011/0022916 A1* | 1/2011 | Desai | .................... | G06F 1/3203 714/748 |
| 2013/0136255 A1* | 5/2013 | Brown | .................. | H04L 9/0869 380/28 |
| 2014/0040336 A1* | 2/2014 | Inglett | ..................... | G06F 7/588 708/250 |
| 2014/0040338 A1* | 2/2014 | Van Der Sluis | ...... | H04L 9/0866 708/254 |
| 2014/0223149 A1* | 8/2014 | Inglett | ....................... | G06F 7/58 712/225 |
| 2015/0117646 A1* | 4/2015 | Best | ....................... | H04L 9/0869 380/270 |
| 2015/0160925 A1* | 6/2015 | Kiefer | ....................... | G06F 7/58 708/250 |
| 2015/0351068 A1* | 12/2015 | Deleeuw | ............... | H04W 64/00 455/456.1 |

OTHER PUBLICATIONS

Kelsey, et al., "Yarrow-160: Notes on the Design and Analysis of the Yarrow Cryptographic Pseudorandom Number Generator," available at https://www.schneier.com/paper-yarrow.html; last viewed Feb. 18, 2015.

Barker, E., et al., "Recommendation for Random Number Generating Using Deterministic Random Bit Generators," Computer Security, NIST Special Publication 800-90A, Jan. 12, 2012, 136 pages.

(Continued)

*Primary Examiner* — Sayed Beheshti Shirazi

(74) *Attorney, Agent, or Firm* — David H. Jaffer; Pillsbury Winthrop Shaw Pittman LLP

(57) ABSTRACT

This disclosure describes cryptographic secure implementation of a Pseudo Random Number Generator (PRNG) architecture based on existing Fortuna algorithm, but providing improvements thereupon for gathering and measuring entropy. The improvement includes a unique step of initial seeding that is not covered by Fortuna. The solution should be adapted to a variety of computing and communicating devices, including mobile devices.

15 Claims, 3 Drawing Sheets

(56) References Cited

OTHER PUBLICATIONS

Barak, B., et al., "A model and architecture for pseudo-random generation with applications to /dev/random," 12$^{th}$ ACM Conference on Computer and Communications Security, New York, NY, 2005 pp. 203-212.

Hörchner, D., "The Fortuna PRNG," Chapter 2, Cryptography, Mini Symposium, Jan. 21, 2004, University of Utrecht, Gerard Tel, Editor, pp. 11-23.

Ferguson, N., et al., "Generating Randomness," Chapter 10, Practical Cryptography, Wiley, Apr. 2003.

* cited by examiner

MANAGING ENTROPY IN COMPUTING DEVICES FOR CRYPTOGRAPHIC KEY GENERATION

TECHNICAL FIELD

This patent application is related to providing cryptographic solutions in general. In particular, this disclosure describes utilization of entropy for secure cryptographic key generation.

BACKGROUND OF THE RELATED ART

In modern cryptography, many widely-used and market-mandated algorithm implementations have been already published. Designing secure algorithms does not in itself provide the required security. Security is derived from implementation of the algorithm and the associated key material.

Random data is a cornerstone of cryptographic system design. Cryptographic toolkits leverage random bit generators to provide the basis not only for symmetric/asymmetric keys but also for nonces/salts, password generation, key agreement parameters, and a host of other functions. (A "nonce" is an arbitrary number used in cryptographic communication. A "salt" is random data that are used as additional input to a function that hashes a password.) Random bit generation can be the weak link in the implementation of cryptography. A weak source of random bits can lead to a weak key, which leads insecure data.

The challenge is that generating statistically random bits is difficult. The output should be as unpredictable as possible. From a security perspective, the random bit generation mechanism should be uncontrollable and undecipherable by an adversary.

Further, the unpredictability of the random data generation method should be measured to provide some level of assurance that "true" randomness is achieved. True randomness means there is no discernable or predictable pattern of generated bits, and that each bit generated has no dependency or relationship to the previously generated bit.

In computing, entropy is the randomness collected by an operating system or application for use in cryptography or other uses that require random data. Government standards exist for cryptographic applications, including standards related to entropy. According to National Institute of Standards and Technology (NIST) Entropy Source Guidelines SP800-90B, the only way for a seed value to provide real security is for it to contain a sufficient amount of randomness, i.e., from a non-deterministic process referred to as an entropy source. And ideally, it should be measurable.

What is needed is the cryptographic secure implementation of a Pseudo Random Number Generator (PRNG) architecture based on existing algorithms, but providing improvements thereupon for gathering and measuring entropy. These solutions should be adapted to a variety of computing and communicating devices, including mobile devices.

SUMMARY OF THE DISCLOSURE

This disclosure enables design of a cryptographic key generation solution that not only meets proposed standards for federal government but also adds in additional layers of security and assurance of the solution. Though this disclosure describes cryptographic library architected for mobile devices as an illustrative example, persons skilled in the art would appreciate that the disclosure is not limited to mobile devices, and can be suitable for other types of computing devices as well.

This disclosure covers, inter alia, the following: a set of logical diagrams of the cryptographically secure pseudo-random number generator (CSPRNG); the method for the module to accumulate and manage the entropy pool to ensure that calls for obtaining data from it contains enough entropy even for the earliest calls; the method for the module to manage the queue of incoming requests for data from the pool to ensure it has enough entropy for all of them and a definition of the length of the output from the random pool for each incoming requests. This disclosure also covers methods for managing impact of failing entropy on current entropy of system, as well as, methods for managing forward and backwards security.

Specifically, this disclosure describes a computer-implemented method of managing entropy for secure cryptographic key generation in a computing device, the method comprising: initializing a seeding process by adding an initial amount of data to an entropy pool; harnessing entropy from a plurality of entropy generating sources in the computing device to add to the entropy pool; and, managing amount of entropy in the entropy pool by ensuring that there is a minimum amount of entropy in the entropy pool while sending out respective outputs responding to corresponding incoming requests for data, thereby maintaining a required security strength of the cryptographic key. The entropy management is performed a combination of the following: managing queue of incoming requests, managing reseeding of the entropy pool, deciding which entropy pool to use, and managing length of the output data stream.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION OF THE EMBODIMENTS

Figure 1:
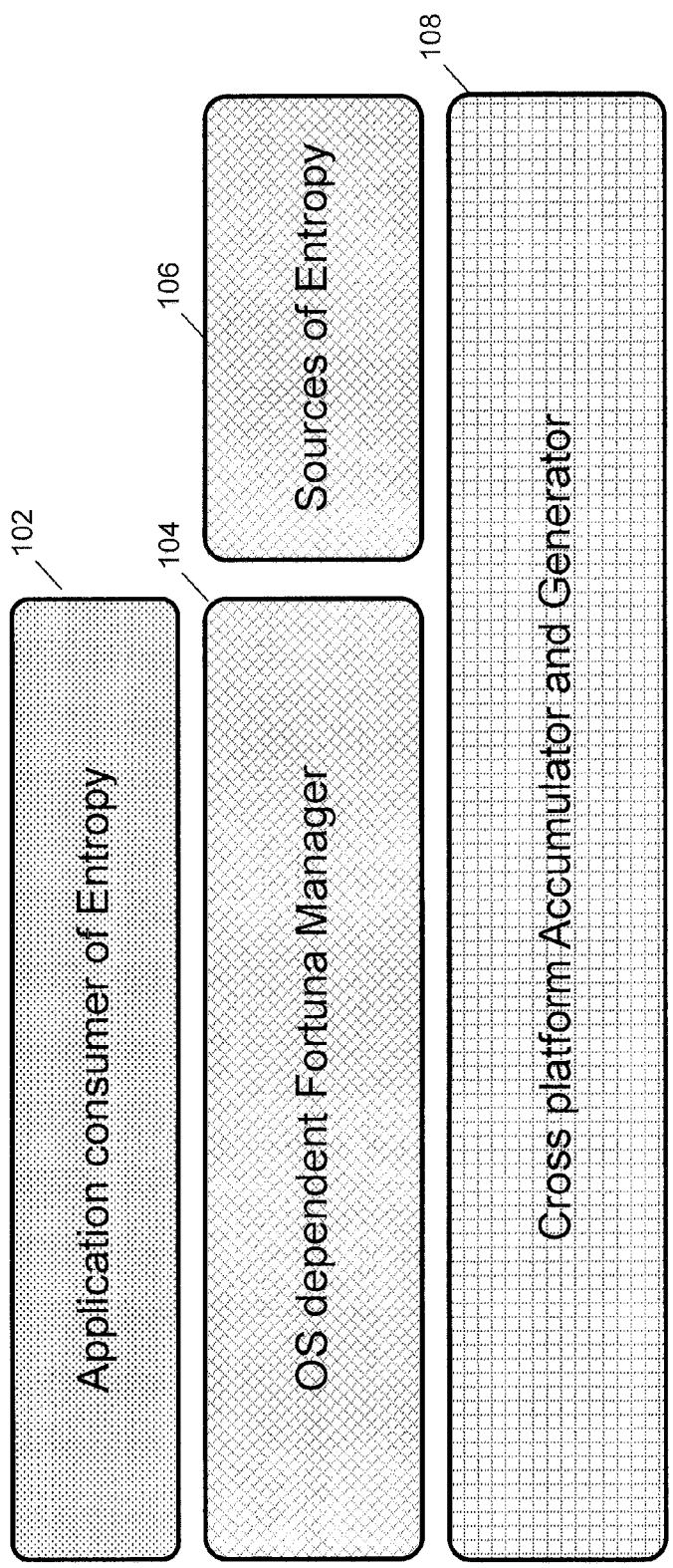
FIG. 1 illustrates a schematic of an architectural stack, according to an embodiment of the present disclosure.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

This document describes the architecture and implementation of a cryptographically secure pseudo random number generator (CSPRNG) and its implications. It does not go into much detail on the individual sources used to feed entropy to the pools of the CSPRNG itself. However, interested readers are encouraged to consult publicly available references, such as, the book titled, "Practical Cryptography" (Ferguson and Schneier, Wiley, 2003), especially Chapter 10, and, an article titled, "A model and architecture for pseudo-random generation with applications to/dev/random," by B. Barak and S. Halevi (ACM Conference on Computer and Communications Security, pages 203-212, 2005). Further information can be found at an article referred to as the "Yarrow paper," which is available at the website: https://www.schneier.com/paper-yarrow.html.

As described here, the present disclosure improves upon existing algorithms. An existing algorithm, known as the Fortuna, is described by Ferguson and Schneier in the book "Practical Cryptography," This provides an implementation of a CSPRNG. It is an improvement over Schneier's previous CSPRNG Yarrow (the "Yarrow paper") in that it doesn't require dynamic estimate of Entropy which provides a false sense of security as the attacker may know quite a bit about the sources of entropy and indeed, could even be able to manipulate it, as described in the ACM conference paper.

The Fortuna algorithm includes: an accumulator, which handles incoming addition of entropy into 32 pools; a generator, which utilizes encryption to generate and reseed the PRNG; entropy sources; and, seed file management capability. In the present embodiments, AES256 in counter mode is used as the encryption.

The description of the Fortuna algorithm leaves a few details up to implementation. As a result, there have been different interpretations on the algorithm. However, certain rules are described with a high degree of clarity and therefore are followed with a relatively high degree of consistency. The embodiments of the present disclosure follow these rules and improve upon them. The rules include, but are not limited to:

Typically, there should be 32 pools of entropy.
When entropy is added, it should be spread evenly over all the pools. This is managed by entropy injection component.
A reseed should occur whenever the first pool has sufficient entropy. For the purpose of this disclosure, for sufficient entropy, 64 bytes have been added to the first pool.
Pool N should be used for the reseed K if and only if K is divisible by $2^N$. In this way, the first pool is always used for reseeding.
The counter should be incremented on every reseed.
The generator encrypts a 128 bit integer which is incremented every time a block of data (16 byteqs for AES256 encryption) is requested.
A rekey occurs by using the same process as the PRNG to generate random data for the key.
It should reseed no more frequently than 10 times a second.
For large data requests greater than 1 mebibyte (MiB), a rekey should occur every 1 MiB requested.
A rekey should occur after each data request.
Reseeding uses two iterations of SHA-256 (Secure Flash Algorithm with a hash value of 256) on the pools used plus the current key.
As an optimization pools are implemented as hashes and stored as digests.
The seed should be saved for reuse on next startup.
Reseeding occurs when random bits are requested.

In the embodiments of the present disclosure, the entropy accumulator is designed to be resistant against "injection attacks," without needing sophisticated and unreliable estimators of entropy, as used in the existing algorithms.

FIG. 1 schematically shows the main components of a CSPRNG architecture stack. Block 102 shows client applications consuming entropy. The operating system dependent code (block 104) is responsible for safety of a data thread, seed file IO, and API for client applications. Block 106 indicates sources of entropy generation for being consumed by block 102. Block 108 indicates other codes for cross-platform accumulator and generation of entropy.

Entropy harnessing is a central premise of this disclosure. The solutions proposed here can be especially suitable for mobile devices. Traditional means of gathering entropy for workstations and servers are insufficient, ineffective, and even unavailable on mobile devices. Mobile devices have architectures and features that allow for the gathering of multiple unpredictable inputs to add complexity to the mix. Typically, the following sources are considered for the generation of entropy, especially for mobile devices: power consumption modules, camera, Global Positioning System (GPS), accelerometer (that detects and monitors vibration in rotating devices), gyroscope (that measures or maintains orientation, based on the principles of angular momentum), compass, microphone input, radio baseband, touch screen motion, etc.

Figure 2:
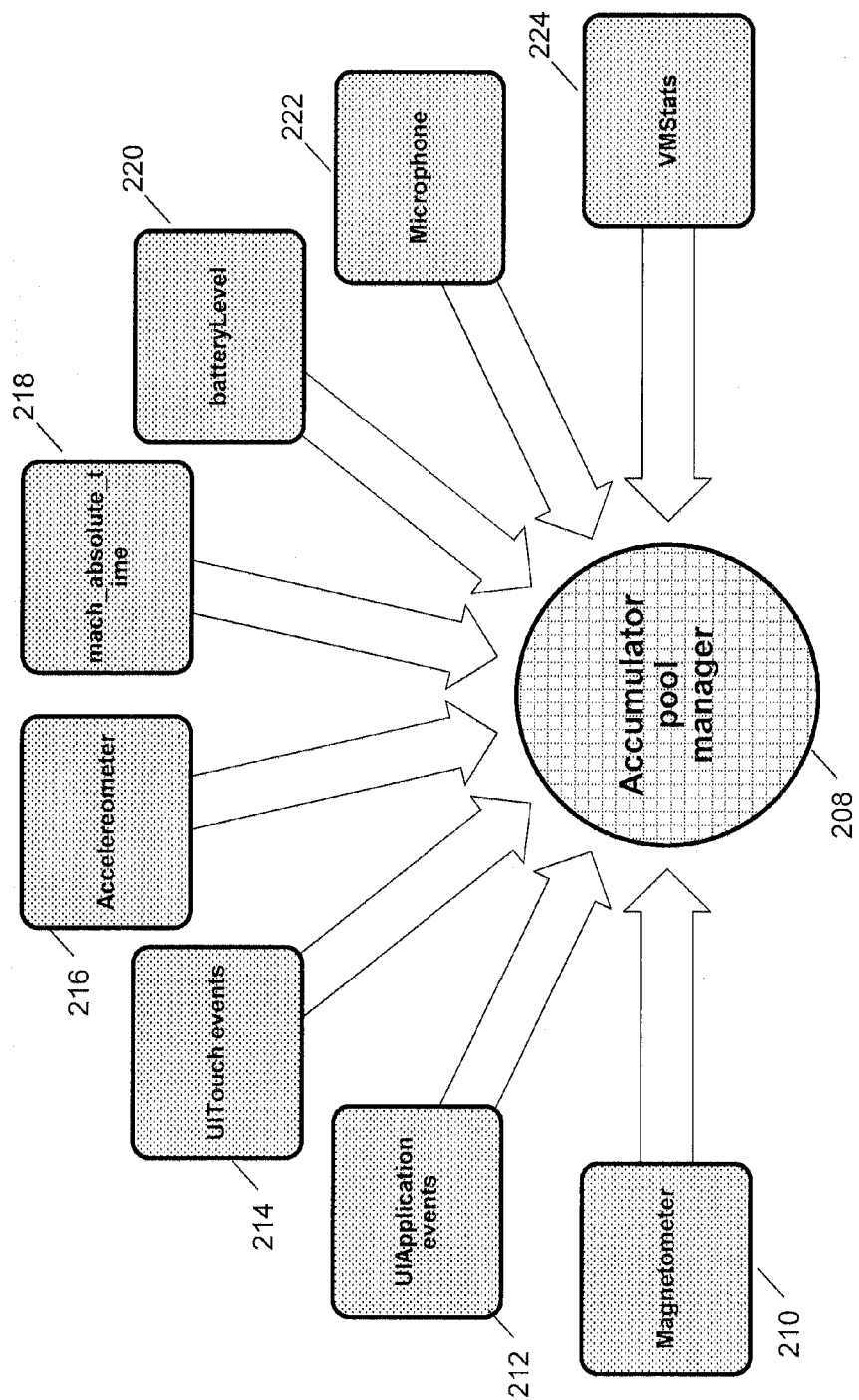
FIG. 2 illustrates a logical view of entropy sources on an operating system platform, according to an embodiment of the present disclosure.

FIG. 2 illustrates an embodiment where an entropy accumulator/entropy pool manager module 208 in a mobile device using an iOS platform gathers entropy from various possible sources, such as: a magnetometer (block 210), user interfaces (UI) such as UIApplicationevents (block 212—these extensive events occur depending on how the software is written and how the user and application interacts with the operating system), UITouch events (block 214), accelerometer (block 216), mach_absolute_time (block 218—a very high resolution clock), battery level (block 220), microphone (block 222), virtual memory statistics (VMStats) (block 224) etc. Though iOS is shown here as an example, other platforms are also supported, such as Andriod, MacOS, Linux, and Windows.

In general, most applications, when being used, have a very high user interaction aspect. So the current algorithm utilizes them as potential high source of entropy. In the worst case, no events are generated, and entropy value would be zero.

Depending on the operating system and the computing device, other sources of entropy may include, but are not limited to: central processing unit (CPU) temperature, speed of fans installed in the CPU, operational environment, counters, interruptions, non-deterministic chaos generated by the environment, WiFi strength etc.

Entropy pool management is a key feature of the present implementation. This is accomplished by having 32 pools (N=0 to 31), each of which are used on reseed #K if K is divisible by $2^N$. The Nth pool is used only $\frac{1}{2^N}$ of the time. Higher-numbered pools, in other words, contribute to reseedings less frequently but collect a larger amount of entropy between reseedings. Reseeding is performed by hashing the specified entropy pools into the block cipher's key using two iterations of SHA-256 secure hash algorithm. This ensures that there will be some n for which the nth pool collects enough entropy between reseedings that a reseeding with that pool ensures security. And that pool will be used at an interval proportional to the amount of entropy in question. The time to recover from an injection attack is bounded by 8192/p where p is the rate of entropy going into the system. The solution proposed here is to ensure that every entropy pool has at least 64 bytes added to it (i.e., 256*32=8192 bits of potential entropy is added to each pool.)

On startup, a seed file is loaded which has the seed state of the CSPRNG persisted to disk, i.e. the state written to an area of the memory that can be read on startup. This ensures that even on application startup, enough entropy exists in the system to be used. The seed file is backed up at least once (and preferably twice in case the first backup fails), so on next startup it will utilize the current state of the system and does not need to re-establish entropy. Initial seeding is not covered by the existing algorithm Fortuna. This is unique to the improvement proposed in this disclosure. The solution proposed here is to ensure that every pool has at least 64 bytes added to it (256*32 or 8192 bits of potential entropy) before seeding. A method is available which returns the amount of entropy required before initialization has taken place. This initialization process of the present disclosure provides a solution that is robust against low-entropy data stream (i.e. a data stream that is not random enough to be considered secure).

In an embodiment, on the first initialization of the CSPRNG, the system will use entropy from all of the pools. The system will not be considered initialized until every pool has at least 64 bytes of entropy.

This accumulator and generator allows for both backwards and forward security as a rekeying is done after every data request as well as every 1 MiB of data which ensures that a compromised key will not reveal future outputs. The recovery time from an injection attack is rapid because higher order pools will collect entropy which will be unknown to the attacker. Even if a key is compromised, an attacker will not be able to know future outputs of the entropy and/or seeding mechanism.

Figure 3:
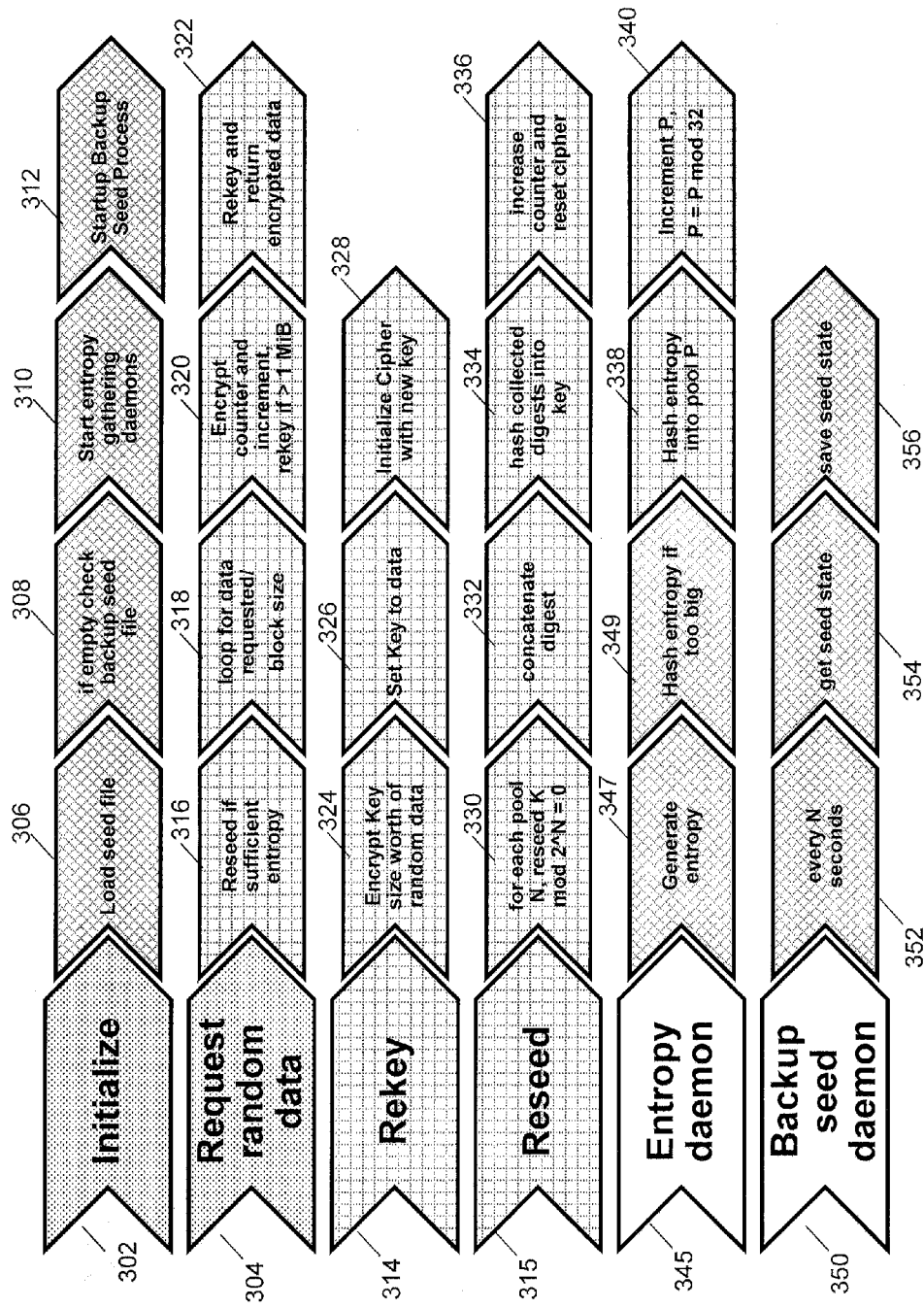
FIG. 3 illustrates operational flow diagrams, according to embodiments of the present disclosure.

FIG. 3 shows how the improvements proposed by the present disclosure are integrated into the sequence of operation that is at its core based on Fortuna algorithm. In summary, the first line of the process flow shown in FIG. 3 is the initialization process that happens at machine startup. The second line describes what happens when an external process requests data. The third and the fourth lines explain in more detail the processes that are initiated from the second line, i.e. from data request. The last two lines (i.e. entropy daemon and the backup seed daemon) are processes that are initiated from the initialization process on the first line. Persons skilled in the art will recognize that the sequence of the steps shown in FIG. 3 are merely illustrative and can be modified. Some steps may not be needed for some embodiments, and some processes may run in parallel to each other. Additional steps may be needed for some embodiments within the scope of the disclosure.

On the first line, the sub-steps of the process "Initialize" (block 301) are blocks 306 (load seed file), 308 (if empty, check back up seed file), 310 (start entropy gathering daemons), and 312 (startup backup seed process). They represent operating system (OS) dependent Fortuna singleton management code. Block 302 (Initialize) is what the present algorithm introduces into the Fortuna flow. Block 302 is related to application request layer 102 shown in FIG. 1. Block 304 (Request random data) is also related to application request layer. Sub-steps for block 304 include blocks 316 (request if sufficient entropy), 318 (loop for data requested/block size), 320 (encrypt counter and increment rekey if >1 MiB), 322 (rekey and return encrypted data).

The cross platform accumulator and generator blocks (related to the block 108 shown in FIG. 1) are inter-woven into the Fortuna process flow. For example, blocks 316 (reseed if sufficient entropy), 318 (loop for data requested/block size), 320 (encrypt counter and increment rekey if >1 MiB), 322 (rekey and return encrypted data) can all be cross platform components. The steps of rekeying (block 314) and reseeding (block 315) may also be cross-platform. Rekey process flow may have sub-steps indicated by blocks 324 (encrypt key size worth of random data), 326 (set key to data) and 328 (initialize cipher with new key). Similarly, reseed process flow may have sub-steps indicated by blocks 330 (for each pool N, reseed K mod $2^N$), 332 (concatenate digest), 334 (hash collected digests into key), and 336 (increase counter and reset cipher).

Blocks 345 (entropy daemon running in the background) and 350 (backup seed daemon) are also part of Fortuna. Entropy daemon process flow includes the blocks 347 (generate entropy), 349 (hash entropy if too big), 338 (hash entropy into pool P) and 340 (increment P by P=P mod 32). Backup seed daemon process flow includes blocks 352 (seeding every N seconds), 354 (get seed state) and 356 (save seed state). Blocks 338 and 340 may be part of the cross platform layer.

Aspects of the disclosure can be implemented in any convenient form. For example, an embodiment may be implemented by one or more appropriate computer programs which may be carried on an appropriate tangible carrier medium. Embodiments of the disclosure may be implemented using suitable apparatus which may specifically take the form of a programmable computer running a computer program arranged to implement a method as described herein.

The descriptions above are intended to be illustrative, not limiting. Thus, it will be apparent to one skilled in the art that modifications may be made to the embodiments as described without departing from the scope of the claims set out below.

The invention claimed is:

1. A computer-implemented method of managing entropy for secure cryptographic key generation in a computing device, the method comprising:
   initializing a seeding process by adding an initial amount of data to an entropy pool; harnessing entropy by starting entropy daemons to gather entropy from a plurality of entropy generating sources in the computing device to add to the entropy pool; and managing amount of entropy in the entropy pool by ensuring that there is a minimum amount of entropy in the entropy pool while sending out respective outputs responding to corresponding incoming requests for data, thereby maintaining a required security strength of the cryptographic key; wherein the entropy pool is one of a plurality of entropy pools, and the N-th pool of the plurality of entropy pools is reseeded for every $2^N$-th incoming request for data; wherein the method includes using encryption algorithms; wherein the encryption algorithms integrate cross-platform accumulation of entropy into the entropy management scheme.

2. The method of claim 1, wherein the managing step is performed by one or a combination of the following: managing queue of incoming requests, managing reseeding of the entropy pool, and managing length of the output data stream.

3. The method of claim 2 wherein the managing step further includes: deciding which entropy pool to use in response to an incoming request.

4. The method of claim 2, wherein reseeding is performed by hashing the specific entropy pool.

5. The method of claim 2, where each entropy pool collects enough entropy between reseedings to ensure the required security strength of the cryptographic key.

6. The method of claim 1, wherein the initial amount of data added to the entropy pool in the initializing step comprises at least 64 bytes of data.

7. The method of claim 1, wherein the initialization step comprises: loading a seed file into the entropy pool.

8. The method of claim 7, wherein the seed the has a seed state of a cryptographically secure pseudo random number generator (CSPRNG) written on an area of a memory of the computing device that is read on application start up.

9. The method of claim 8, wherein the seed file is backed up at least once, wherein a current seed state is available on the next application startup, obviating the need to re-establish entropy.

10. The method of claim 1, wherein the computing device is a mobile device.

11. The method of claim 10, wherein the plurality of entropy generating sources include one or more of: a magnetometer, an accelerometer, a gyroscope, a microphone, a navigation module, a compass, a camera, a timing clock, a user interface event, a user touch event, a battery level indicator, a power consumption indicator, a wireless access strength, a network speed, a processor temperature, a processor fan speed, an operational environment, a counter, an interruption, a non-deterministic chaos, a touch screen motion, a radio baseband, and, virtual memory statistics.

12. The method of claim 1, wherein entropy is consumed from the entropy pool when a user interacts with applications installed in the computing device.

13. The method of claim 1, wherein the computing device has one of the following operating systems: iOS, MacOS, Windows, Linux, Android.

14. The method of claim 13, wherein the method includes using the encryption algorithms that are customized to be compatible with the operating system of the computing device.

15. The method of claim 1, wherein the encryption key is backwardly secure, wherein even if the key is compromised, the future output from the entropy pool is unpredictable.

* * * * *